United States Patent
Morin

[15] 3,680,696
[45] Aug. 1, 1972

[54] SCREENING

[72] Inventor: Dennis R. Morin, Wrentham, Mass.

[73] Assignee: Bird Machine Company, South Walpole, Mass.

[22] Filed: March 23, 1970

[21] Appl. No.: 21,935

[52] U.S. Cl. ............... 209/240, 209/273, 209/306, 210/304, 210/415
[51] Int. Cl. ............................................. B07b 1/20
[58] Field of Search......209/273, 305, 306, 362, 397, 209/296, 300, 303, 304, 240; 210/415, 304

[56] References Cited

UNITED STATES PATENTS

| | | | |
|---|---|---|---|
| 3,400,820 | 9/1968 | Nelson | 209/273 |
| 1,163,275 | 12/1915 | Spangenberg | 209/296 |
| 3,458,038 | 7/1969 | Young | 209/273 X |

*Primary Examiner*—Frank W. Lutter
*Assistant Examiner*—William Cuchlinski, Jr.
*Attorney*—John Noel Williams

[57] ABSTRACT

Screening apparatus capable of making a sharp separation based on size of solids in fluid pulp has a screen cleaning rotary drum wall disposed adjacent to a screen plate. According to one aspect of the invention the rotor and screen plate form an accepts zone, the drum wall having sloped pulse-generating surface portions that sweep fully across the effective apertures of the screen plate, producing fluid pulses that act to dislodge over-size solids from the apertures, the accepts fluid flowing with an axial component along the rotor wall as it flows toward the removal outlet. Preferred embodiments include an inward flow machine, with rotor within a cylindrical screen plate; rotor cross-sections identical in planes through all apertures in the screen plate; curved rotor surface portions, e.g., elongated cylindrical sections or smooth lobes; flat rotor surface portions sloped relative to the rotor circular path; narrow axially extending screen apertures; rotor which aids in driving accepts fluid into the accepts outlet; inlet spreading of stock over the full length of screen toward rejects outlets at opposite ends and other important details. According to another aspect of the invention mutual extensions of screen plate and rotor surface combinations beyond the apertured region of the plate preserve the full intensity of positive or negative pulses in the end rows of screen plate apertures.

22 Claims, 16 Drawing Figures

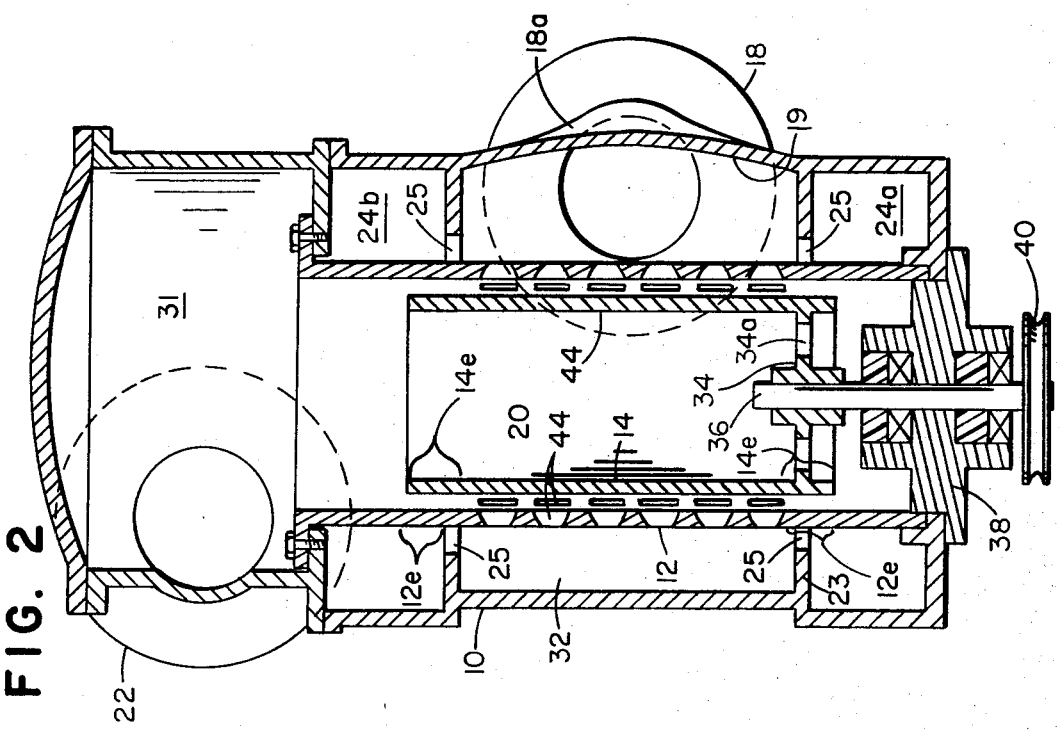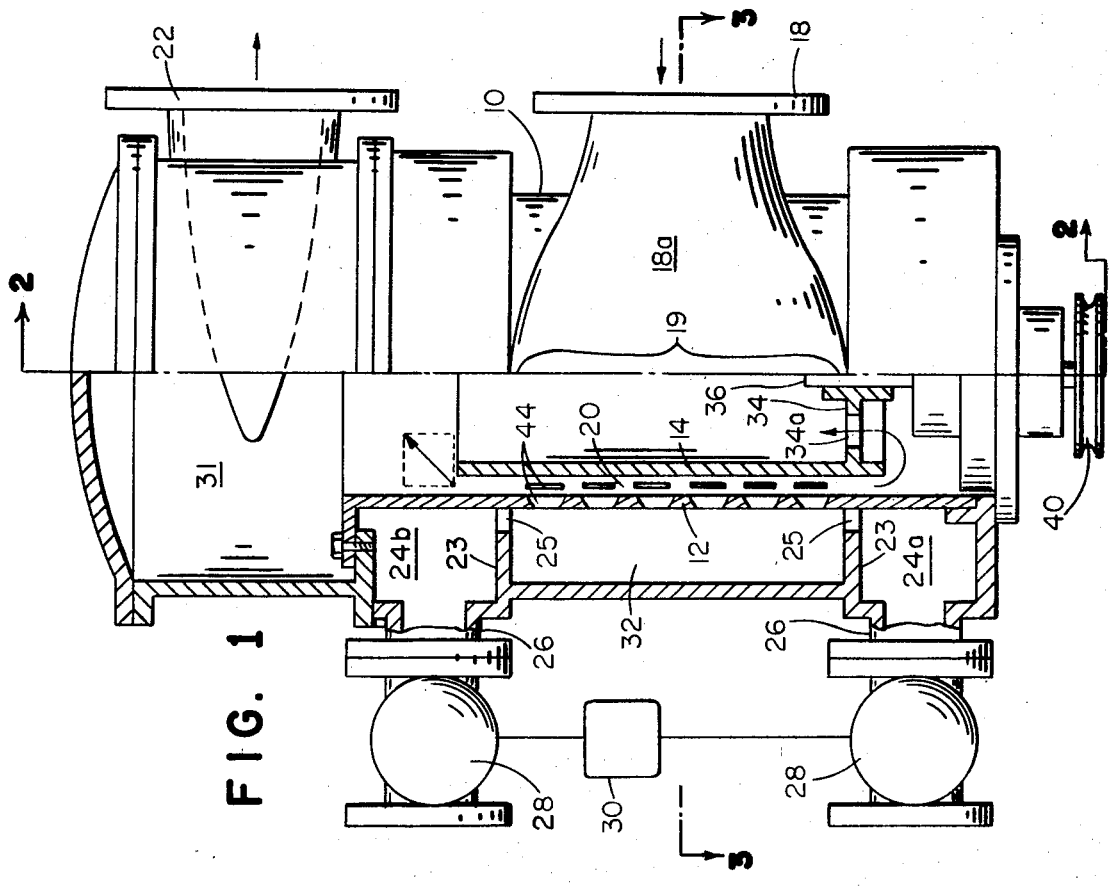

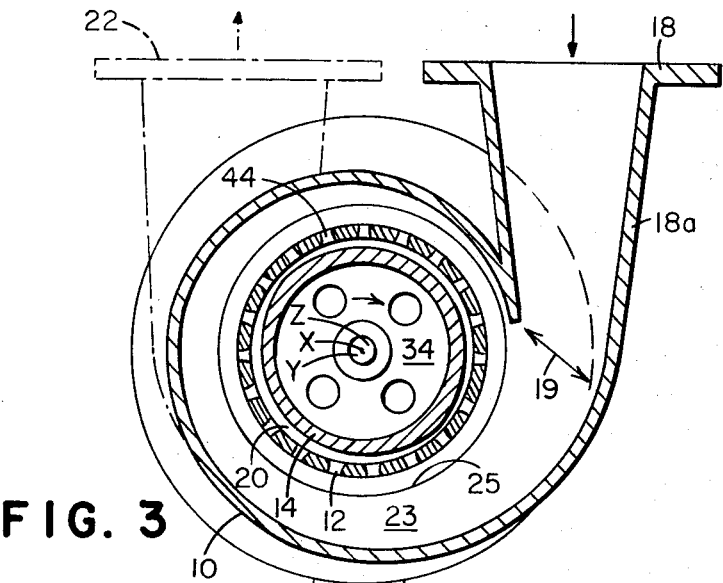
FIG. 3
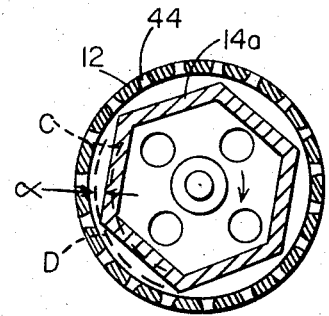
FIG. 3A
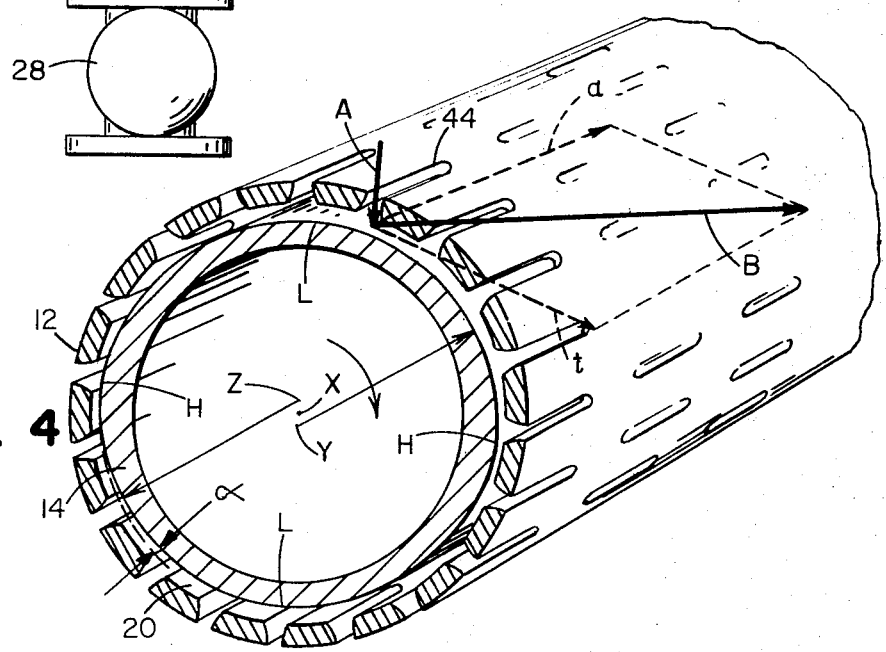
FIG. 4
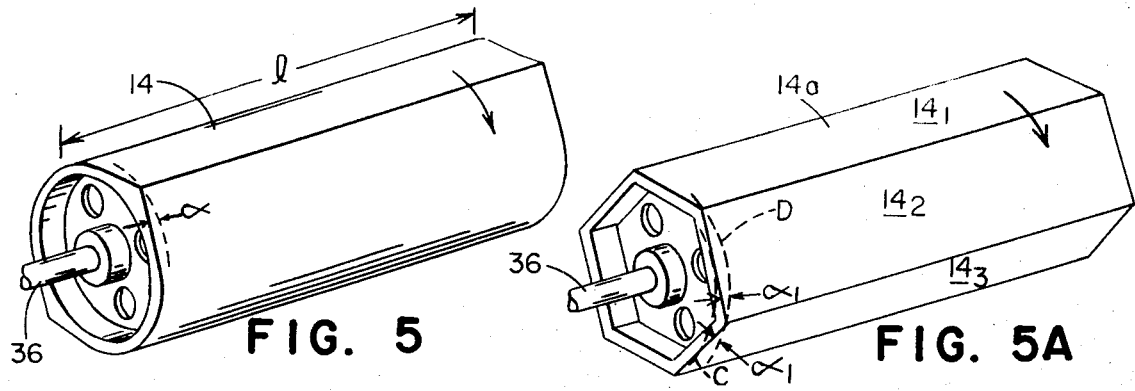
FIG. 5
FIG. 5A

SCREENING

This application relates to screening apparatus suitable for conditioning paper pulp in the cylinder mold production of paperboard and for conditioning fluids in other processes having strict accepts or rejects size requirements.

Objects of the invention are to provide screening apparatus which under substantial flow and pressurized conditions, is capable: of making a sharp, positive separation between sizes of components of a fluid stock; of operating with minimal loss of acceptable fiber components, low pressure drop across the machine and acceptable power requirements; of making the separation without dilution of the consistency of the stock or break-up of the debris; of providing protection to the machine against jamming of metal debris against the moving rotor; and of being adjustable over a range of settings to fulfill the different process requirements of paperboard mills and others.

According to one aspect of the invention it is realized that by positioning a moving screen-cleaning wall-form rotor on the accepts side of the screen plate (having no more than about 20 percent open area) with pulse generating sloped surface portions on the rotor arranged to sweep fully with uniform intensity across the apertures, substantial accepts flow can be maintained while oversize particles remain behind. Rejects may be removed at a low flow rate, e.g. at rates less than 3 percent of inlet flow, using an intermittently operated valve or a continuous small flow. The screening result can be markedly different from the more usual type of paper pulp screening in which distinct increase in concentration of the stock occurs along the screen plate and separation of the reject components of the pulp proceeds on a probability basis, using apertures larger than the particles desired to be removed.

Featured also are screen apertures in the form of narrow axially extending slots fully swept by sloped segments or the like of a rotary wall, and mutual extension of such screen and wall beyond the effective screening area for maintaining the intensity of screen-cleaning fluid pulses.

These and other objects and features of the invention will be understood in light of the abstract, adopted herein by reference, and the following detailed description of a preferred embodiment taken in connection with the drawings of a preferred embodiment wherein:

FIG. 1 is a longitudinal cross section of a preferred embodiment of the invention;

FIG. 2 is a longitudinal cross section taken on line 2—2 of FIG. 1;

FIG. 3 is a transverse cross section taken on lines 3—3 of FIG. 1;

FIG. 3a is a transverse cross section similar to FIG. 3 of the rotor and screen components of a second embodiment;

FIG. 4 is a diagrammatic perspective view of the screen and rotor portions of FIG. 1;

FIG. 5 is a perspective view of a rotor for the first described embodiment and FIG. 5a is a similar view of a rotor for the second embodiment;

Figure 6:
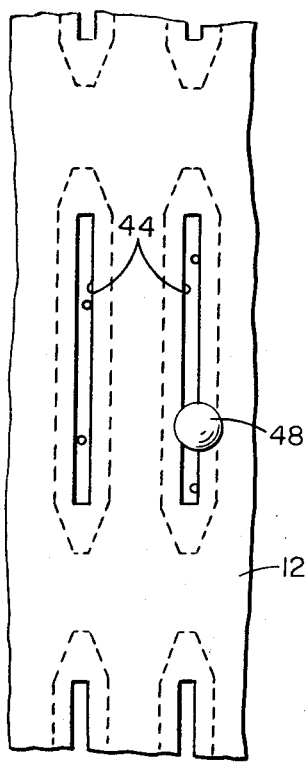
FIG. 6 is a side view.

Referring to FIGS. 1–4 the preferred embodiment employed to illustrate the invention comprises a pressure casing 10, a screen plate 12 and a screen-cleaning rotor 14 in the form of a drum. The term "screen-cleaning" is meant to refer here to a device operable to cause periodically a reverse movement, against the accepts direction of flow, of oversize, rejected solids at the screen plate surface. By this action a screen cleaning device is operable to dislodge over-size particles and enhance flow of acceptable size particles through the screen plate.

The casing 10, with the screen plate 12 fitted therein defines a screening zone 32 connected to inlet spout 18, and, at each end of the screening zone, reject gutters 24a and 24b are connected to rejects outlet pipes 26, thence to intermittently operable valves 28 operated by timer 30. While the machine can be oriented in any direction it is shown with a horizontal axis of rotation.

The inlet 18 has a transition section 18a from its circular connection flange which flattens and connects to the screening zone through an inlet mouth 19 which extends from one to the other extremity of the screening zone 32, the casing 10 around the screening zone having a volute form.

Between the screen plate 12 and surface of rotor 14 is defined an accepts zone 20 which communicates with the accepts spout 22 at one end of the rotor. Accepts flow enters through the apertures on substantially radial path A (FIG. 4). Then rotor 14 transmits tangential forwarding force to the accepts, vector $t$, as the fluid is subjected to pressure drop across the machine. This pressure drop applies force vector $a$ in the axial direction. Accordingly the accepts fluid flows in somewhat helical resultant paths B toward the ends of the rotor. It then proceeds to compartment 31 where it circulates and discharges through tangential accepts spout 22. Due to this tangential driving effect t and interception of the circulating flow by spout 22 the pressure drop across the entire machine is kept low.

The rotor 14 is hollow and provided with an apertured internal web 34 near the driven end of the machine. To this web is connected shaft 36 which supports rotor 14 within the screen in cantilever fashion. Shaft 36 passes through seal and bearing assembly 38 to driven shive 40.

The apertures 34a (as could also apertures in the rounded wall of the rotor), provide alternative flow paths for stock from the respective regions of the accepts zone 20, thus avoiding dead spaces in the accepts zone as well as helping to avoid pressure losses.

Figures 7, 7A:
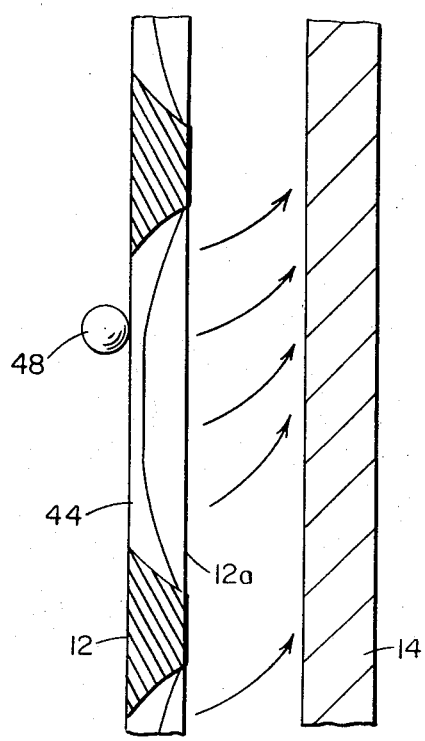
FIGS. 7 and 7a are longitudinal cross sections and FIGS. 8, 9, 10 and 11 are diagrammatic perspective view of a representative slot of the preferred screen plate shown in FIG. 1 illustrating various conditions that may exist during operation of the machine.

The screen plate is of slotted construction, comprising a plurality of side-by-side slots 44 which are much longer than wide. As shown in FIGS. 6 and 7 at the place of the slot the accepts side 12of the screen plate 12 is relieved and the slot 44 is formed in this reduced-thickness section 12r. A great multiplicity of these slots are provided in the screen plate, distributed from end to end.

The rotor 14 of this embodiment is of lobed form, having its effective surface directed toward the accepts side of the screen plate. The lobes comprise eccentric portions of the rotor extending throughout the length $l$ thereof, which corresponds to the effective length of the screen plate. In the embodiment shown the rotor is of uniform cross section from end to end. Referring to FIGS. 3 and 4 the center of rotation of the rotor 14 is at X. The lobes in this embodiment comprise two semi cylindrical surface formations, formed about centers Y and Z, which are spaced equally but in opposite directions from center of rotation X. Thus the two surface formations are eccentric with respect to center X, having low points L and high points H, the latter comprising the lobes that have been referred to. The surfaces extend at acute angles $\alpha$ (FIG. 4) relative to the circular paths of points closest to the screen plate. The rotor is so shaped, spaced from the screen plate and driven, that the rotor assists the fluid reaching the screen plate to flow therethrough, leaving behind all solids larger than the apertures. The top-to-bottom unscreened stock inlet 19a to the screening zone 32 serves to prevent detrimental increase of consistency in the zone 32, and permits this action. Also the high speed swirling stock in the screening zone, attributable to the tangential inlet and the volute casing can assist the screening effect by promoting rapid displacement of dislodged over-size particles.

Figure 8:
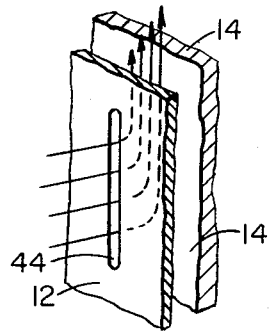
Figures 9, 10:
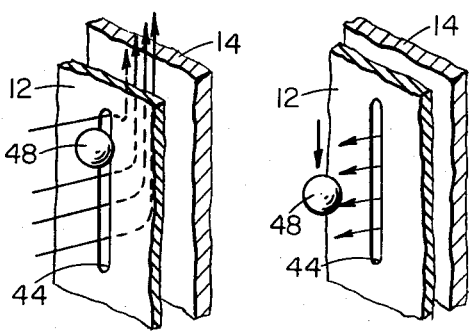
Figure 11:
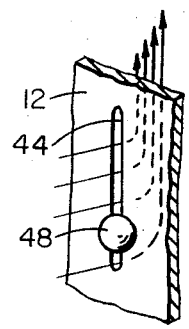

FIGS. 7, 8 and 9 illustrate that as the rotor 14 rotates past the slot 44, the fluid advances through the slot under the influence of the general pressure drop across the screen as well as the local drawing effect of the negative pulse portion of the rotor. The fluid carries with it only the solids which are smaller than slot 44 while a solid 48 larger than the slot is restrained, FIG. 9. With the rotor suitably close to the screen the flow-assisting forces of the rotor acting on the fluid are significant.

The screen cleaning effect of the rotor is achieved when a positive pulse portion of the rotor approaches and sweeps over the full extent of the slot FIGS. 7a and 10. This is followed by the significant assisting or pumping effect of the negative pulse portion of the rotor.

(It should be noted that in the drawings the slots are shown greatly exaggerated in width. In practice the slots have a length to width ratio greater than 20 to 1. They have a width less than 0.030 inch, preferably about 0.020 inch, in comparison to an axial length of say, 1 ½ inches. In general there are on the order of 10 such slots per inch, in the circumferential direction, and the rows occupy most of the screen plate area, e.g. successive rows are spaced 1 inch apart axially.)

The pulse intensity is maintained in the slot due to the close proximity of the rotor wall to the screen plate, see both FIGS. 3 and 7a, this small clearance, e.g. one-fourth inch, allowing a strong pulse to be generated in the various directions. In preferred embodiments, there are provided beyond the slotted area of the screen plate in both axial directions, extensions 12e and 14e (FIG. 2) of the unslotted screen plate and rotor for pulse maintenance for the end rows of slots, (a feature applicable to screens where the rotor is on the inlet side as well). In this connection, the screen plate as well as the rotor can be viewed as a pulse generating surface. That is to say, with this pair of closely spaced members, a much greater pulse is obtained than would be present in the absence of the screen plate. The open space beyond the end of this pair of surfaces affords a dissipating volume, reducing the pulse between the last portions of the opposed surfaces. By providing the extensions just mentioned full screen-cleaning pulse strength is maintained at the end rows of the elongated apertures by the action of the pulsing rotor.

Referring further to the drawings the positive pulse is found sufficient to unseat oversize debris particle 48 from the slot, FIGS. 7a, 10. It is then affected by the rapid tangential movement of the stock, which moves it away from the slot. Such debris that reaches either end of the screen plate may enter reject gutter 24a or 24b.

By providing a central inlet and by spreading the stock across the screening zone, and by providing the volute housing, uniform conditions are established, with flow lines appearing which assist endward movement of rejects. The reject outlets at both ends can assure removal of rejects in cooperation with this pervasive endward spreading inlet flow.

Periodically the timer 30 operates reject valves 28, which discharge the reject gutters and draw sudden bursts of fluid from the screening zone 32, purging the system of debris. (Instead of two separate valves, a tee connection between both rejects outlets and a single rejects valve may be employed. In other instances a small continual flow may be maintained through the rejects connections.) The narrow entries 25 to the rejects gutters defined by dividers 23 may serve to cause most of the flow from the screening zone to be from the vicinity close to the screen plate where the rejected solids may be, (and may also serve to confine rejects in a quiescent state in the rejects gutter).

With high speed rotation of the rotor and through the cooperation of the various features the solids may thus be effectively subjected at a high rate to a "go," "no go" test against the barrier of the screen plate and debris is effectively removed on a size basis.

Because an aperture is effectively swept over its full extent by an overlapping segment of pulse-generating rotor surface, pulses of uniform and adequate intensity, and their cleansing effect, are assured throughout the aperture area. By assuring the same cross-sectional form of rotor at every plane through the apertures (perpendicular to the rotor axis) equal conditions are assured for all apertures.

The smooth gradually increasing lobed rotor surface shown avoids dissipation of energy while assuring that the foregoing conditions are met. But at the expense of some additional energy, or for obtaining additional effects, other rotor forms such as cylindrical segments of smaller radius attached to the rotor wall may be employed, etc.

In a typical machine of medium size the following parameters produce the desired effect:

| Screen plate | | |
|---|---|---|
| axial length of affected area | 11 ½" | (between extremities of slotted area) |
| inside diameter | 12" | |
| thickness | 1/4" | |
| depth of slots | .040" | |
| width of slots | .017" | |
| length of slots | 1 ½" | |
| number of slots per inch of circumference | 8 | |
| number of circumferential rows of | | |

| | |
|---|---|
| slots | 5 |
| axial space between rows of slots | 1" |
| total number of slots | 1,520 |
| Rotor (with 2 lobes) radius from centers Y and Z | 5 ¾" |
| (rise) distance of Y or Z from X | ⅜" |
| minumum clearance from screen plate | ¼" |
| inlet spout I.D. | 6" |
| accepts spout I.D. | 6" |
| rejects spout I.D. | 3" |
| accepts compartment axial length | 12" |
| inlet zone of outer wall of volute from, over 330° arc, decreases from radius | 9 ¼" to 6 ¾" |
| rejects gutter depth (axial length) | 4" |
| large diameter of rejects gutter | 19" |
| Speed of rotor (direction of rotor rotation is in the direction of tangential accept outlet) | 1285 rpm |
| Motor voltage | 440 v. |

With these parameters the screen was operated on waste paper (newsprint scrap) furnish consistency of 1.1–1.2 percent, with no dilution and demonstrated a capacity of 900–1,000 gpm under pressure drop of 4–6 psi across the screening apparatus, with the rejects valve slightly open to produce a reject flow of approximately 50 gpm. Rejects and accepts consistency remained the same as inlet consistency within the limits of experimental error.

| Lobe Rise | No. of Lobes | RPM | Slot Width | Accept Flow —gpm | Amps. | Pressure drop Across Machine P.S.I. |
|---|---|---|---|---|---|---|
| ⅜ | 2 | 1220 | .017" | 600 | 16 | 2 |
| ⅜ | 2 | 1220 | .017" | 1000 | 16 2 | 4 ½ |
| ⅜ | 2 | 1285 | .017" | 600 | 18 | 2 ¾ |
| ⅜ | 2 | 1370 | .017" | 1000 | 18 ½ | 4 |
| ¼ | 2 | 1370 | .017" | 1000 | 20 | 6 ½ |

The results of these tests showed that substantial flow could be maintained through the 0.017 inch wide slots, with small drop in pressure, screening out particles larger than 0.017 inch wide.

Because of the low consistency (no increase) maintained in the screening zone it follows that lower rejects flow rates or intermittent operation can be employed.

In most cylinder mold applications the average reject flow can be maintained in the region of 1 percent or below and the slot widths may range preferably between 0.010 and 0.020 inch, generally less than 0.030 inch.

Figure 12:
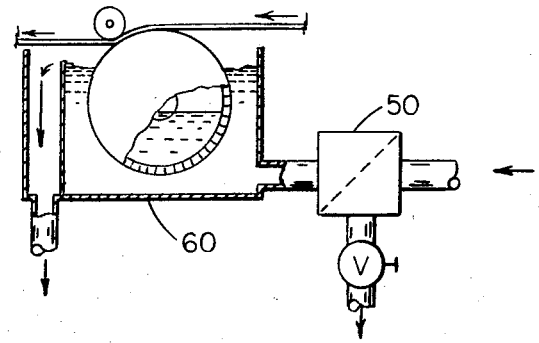
FIG. 12 is a diagrammatic representation of the machine described in use with a cylinder mold machine.

Referring to FIG. 12 a screening apparatus 50 according to the invention is shown conditioning the feed to a cylinder mold machine 60. The furnish may be waste paper containing cubical form debris, e.g. broken pieces of rubber bands and styrene cups, ink balls and similar materials found in waste that originates in office waste baskets. It is found that the invention is effective to remove such debris while not removing any long paper fibers that occur in the furnish, thus ensuring that the strength-giving component of the furnish is not lost.

The resulting accepts flow from the screen is well suited for use with the cylinder mold machine, e.g. for the outer layers of paper board.

Referring to FIGS. 3a and 5a, another embodiment of the invention employs the same structure as shown in FIG. 1 except employing a multifaceted rotor. The rotor shown has a hexagonal cross-section with each facet $14_1$, $14_2$, $14_3$ comprising a planar or flat surface. Such a rotor may be formed i.e. as a weldment of simple flat steel sheet. In FIG. 5a a circle C is projected about the axis of rotation of the rotor 14a, tangent to the facets $14_1$, $14_2$, $14_3$. From this point of tangency each facet projects outwardly each way, providing leading and trailing surface portions and intersecting adjacent facets at regions spaced radially from the tangent circle. Thus it will be understood that each facet is sloped at acute angle $\alpha$, relative to the circular path of travel D of the rotor projections (closest to the screen plate) each facet forming the declining side of one projection and the rising side of the next projection. These facets are capable of producing screen cleaning pulses of considerable magnitude, and may permit greater spacing from the screen plate than the curved surface rotor of the first embodiment. As with the previous embodiment, surfaces extending uniformly end to end of the screen plate are preferred for certain applications. Nevertheless it will be understood that variations along the length are possible so long as the elongated apertures are fully swept, as mentioned above.

As an example, for a 12 inch diameter cylindrical screen plate, with ¼ inch clearance of the rotor from the plate, for achieving a ¼ inch rise from low to high point on the multifaceted, flat sided rotor, a rotor cross-section corresponding to a ten sided regular polygon may be employed for producing the pulses. In this case each flat would have a width of approximately 3 ½ inches (dimension along the flat surface in the plane perpendicular to the rotor axis).

For a 20 inch diameter screen plate, for approximately the same clearance and rise of fourteen-sided regular polygon may be employed for producing pulses. In this case each flat would have a width of approximately 4 ½ inches.

The various dimensions may be varied from case to case. In general to obtain practical pulse generating results, the combined effect of the flat width (generally greater than about 2 inches), clearance (on the order of one-fourth to one-half inch) and rise (greater than one-eighth inch) is so related as to produce a backward pulse greater than the pressure drop across the screen plate.

This multifaceted rotor is believed to be useful in other types of screens, such as outward flow screens with rotor disposed within the screen plate (on the inlet side) as well as with the featured embodiment, described above, in which the rotor is on the accepts side.

Figure 13:
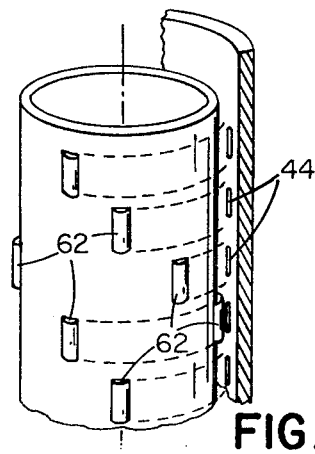
FIG. 13 is a diagrammatic perspective view of another preferred embodiment of the invention.

Another embodiment of the invention may employ the same structure as shown in FIG. 1 except using a rotor base surface of cylindrical form mounted for rotation about its axis and having raised surface portions at spaced locations about the peripheral surface. In the embodiment of FIG. 13 the raised surface portions 62 are cylindrical, formed as ½ inch segments of 1 ½ inch diameter bar stock. In use with a slotted screen plate having axial slots 1 ¾ inch long, the segments are axially arranged, of length 2 ¼ inches aligned so that the path of each segment overlaps respective slots one-fourth inch on each side with clearance of the crest of the bumps from the screen plate on the order of one-fourth inch. Thereby the segments are effective to sweep fully with generally uniform pulse intensity across the respective apertures.

The segments are spaced from each other about the periphery and thus can produce a low stress level in the screen plate during its operation.

It will be understood that various specific details may be varied within the spirit and scope of the invention. In particular the form of the rotor surface portions and the screen aperture may be varied in numerous ways so long as the general conditions above described are observed.

What is claimed is:

1. A screening apparatus capable of separation of the components of a fluid pulp on the basis of size, the apparatus comprising a circular cross-section screen plate having screening apertures comprising a total open area of less than about 20 percent in the region of the plate having screening apertures, means defining a screening zone on one side of said screen plate, means defining an inlet for unscreened stock on said one side; means defining a rejects zone also on said one side for removal of rejected matter, a driven screen-cleaning rotor in the general form of a drum wall disposed on the other side of the screen plate and defining therewith an accepts zone, the drum wall having leading and trailing surface portions that slope relative to the direction of travel of rotor portions closest to the screen plate, said surface portions extending along the length of the rotor sufficiently to sweep fully, with generally uniform intensity, across respective apertures in said screen plate, said leading surface portions shaped to direct pulses through the apertures to dislodge over-size solids therefrom, said trailing portions shaped to assist accepts flow through said apertures, and an accepts outlet positioned to receive and discharge accepted fluid from said accepts zone adjacent said rotor and wherein beyond the region of the screen plate having screening apertures there are mutual extensions of said screen plate and said drum-wall spaced from each other a distance sufficiently close to prevent dissipation of pulses produced by said rotor adjacent the screening apertures.

2. The screening apparatus of claim 1 wherein the cross-sectional profile of said rotor in all planes perpendicular to the rotor axis that project through apertures of said screen plate is identical in form.

3. The screening apparatus of claim 1 wherein said apertures comprise narrow, elongated slots having a width less than 0.030 inches, said slots extending generally parallel to the axis of said rotor.

4. The screening apparatus of claim 1 wherein said accepts zone includes an accepts outlet aligned to intercept circulating fluid flowing from said accepts zone, and said rotor adapted to rotate relative to said aligned accepts outlet in a direction to impart forward pumping force to fluid proceeding towards said outlet.

5. The screening apparatus of claim 1 wherein said rejects zone includes an intermittently operable rejects valve having means to maintain it closed longer than opened, said valve being provided to withdraw a surge of fluid from the rejects zone thereby to remove rejects therefrom.

6. The screening apparatus of claim 1 wherein said sloped surface portions of said rotor are spaced no more than about one-half inch from the accepts side of said screen plate.

7. The screening apparatus of claim 1 wherein said apertures are elongated in the axial direction of said screen plate and said sloped surface portions are longer than and extend beyond the ends of elongated apertures of said screen plate.

8. The screening apparatus of claim 1 wherein said surface portions extend generally parallel to, but centered on axes spaced from the axis of said rotor.

9. The screening apparatus of claim 8 wherein said surface portions are of cylindrical form.

10. The screening apparatus of claim 8 wherein said surface portions are flat.

11. The screening apparatus of claim 1 wherein said surface portions comprise eccentric lobes that extend continuously along the rotor over the axial length of the screen plate.

12. The screening apparatus of claim 11 wherein said surface portions are of cylindrical form having axes offset on the order of one-fourth inch from the axis of said rotor.

13. The screening apparatus of claim 1 wherein said screen is cylindrical, said rotor is disposed within said screen, said screen plate is surrounded by a housing defining said screening zone.

14. The screening apparatus of claim 13 wherein said housing is of volute form and the inlet to the thus defined screening zone is tangential thus to maintain a uniform movement of the stock in the screening zone for moving solids dislodged from the screen plate by the rotor.

15. The screening apparatus of claim 3 having an inlet to a portion of the screening zone intermediate its ends and at each end thereof a rejects zone, each of said rejects zones including a rejects conduit, and valve means for regulating the rejects flow therethrough.

16. A screening apparatus capable of separation of the components of a fluid pulp on the basis of size, the apparatus comprising a circular cross-section screen plate having screening apertures comprising a total open area of less than about 20 percent in the region of the plate having screening apertures, said apertures being elongated in the direction of the axis of said screen plate and having a length to width ratio of at least 20 to 1, means defining a screening zone on one side of said screen plate, means defining an inlet for unscreened stock on said one side; means defining a rejects zone also on said one side for removal of rejected material, an accept zone including an accepts outlet on the other side of said screen plate said accept zone being defined by a rotary wall disposed adjacent to but spaced from said screen plate, said rotary wall having leading and trailing surface portions that slope relative to the direction of travel of rotor portions closest to said screen plate, said sloped surface portions extending along the length of the rotor sufficiently to sweep fully, with generally uniform intensity, across respective apertures in said screen plate, said surfaces extending the full length of said elongated apertures and said surfaces shaped to create general screen-cleaning fluid pulses acting upon said screen plate, there being beyond the portion of said screen plate having said elongated apertures, mutual extensions of said screen plate and said drum wall spaced from each other a distance sufficiently close to maintain screen-cleaning fluid pulses at substantially full intensity at end rows of elongated apertures in said screen plate.

17. The screening apparatus of claim 16 wherein said surface portions have a clearance from said screen plate no greater than about one-half inch.

18. The screening apparatus of claim 16 wherein said surface portions comprise eccentric lobes of cylindrical form centered on axes off-set from the center of the rotor by about one-fourth inch.

19. The screening apparatus of claim 16 wherein said surface portions are flat.

20. The screening apparatus of claim 17 wherein said rotary wall has leading and trailing pulse-generating flat surface portions that slope relative to the direction of travel of rotor portions closest to said screen plate, said flat, sloped surface portions extending along the length of the rotor sufficiently to sweep fully, with generally uniform intensity, across respective apertures in said screen plate.

21. The apparatus of claim 20 wherein said rotor has a cross-section in the general form of a regular polygon having on the order of 10 flat sides.

22. The apparatus of claim 20 wherein the clearance of said rotor from said screen plate is on the order of one-fourth to one-half inch and has a rise greater than one-eighth inch.

* * * * *

UNITED STATES PATENT AND TRADEMARK OFFICE
CERTIFICATE OF CORRECTION

PATENT NO. : 3,680,696
DATED : August 1, 1972
INVENTOR(S) : Dennis R. Morin

It is certified that error appears in the above-identified patent and that said Letters Patent are hereby corrected as shown below:

Column 5, lines 41 and 42 "3/8 8" should be -- 3/8--;
        line 42 "16 2" should be --16 1/2--;
"   "  line 43, "1370" should be --1285--:

"   6, line 42 "of" should be --a--;

Signed and Sealed this

Thirteenth Day of June 1978

[SEAL]

Attest:

RUTH C. MASON
Attesting Officer

DONALD W. BANNER
Commissioner of Patents and Trademarks